United States Patent [19]

Igea et al.

[11] 4,143,697
[45] Mar. 13, 1979

[54] INNER TUBE ASSEMBLY FOR RUN-FLAT TIRES

[75] Inventors: Gilbert L. Igea, Clairoix; Henri J. Mirtain, Compiegne, both of France;

[73] Assignee: Uniroyal, Clairoix, France

[21] Appl. No.: 767,248

[22] Filed: Feb. 10, 1977

[51] Int. Cl.² .......... B60C 17/02; B60C 17/00
[52] U.S. Cl. .......... 152/340; 152/400; 152/330 RF
[58] Field of Search .......... 152/339–342, 152/399–400

[56] References Cited

U.S. PATENT DOCUMENTS

| | | | |
|---|---|---|---|
| 2,399,572 | 4/1946 | Powell et al. | 152/400 |
| 2,525,752 | 10/1950 | Khalil | 152/340 |
| 3,134,420 | 5/1964 | McConkie | 152/340 |
| 3,329,193 | 7/1967 | Mosebach | 152/340 |
| 3,487,870 | 1/1970 | Huber | 152/340 |

*Primary Examiner*—Francis S. Husar
*Assistant Examiner*—Lawrence E. Williams
*Attorney, Agent, or Firm*—Jack Posin

[57] ABSTRACT

An inner tube assembly for a pneumatic tire, comprising a primary annular tube, a secondary annular tube surrounding the primary annular tube, an annular primary tube-restraining band interpositioned between the primary and secondary tubes, and valves intercommuncating the primary and secondary tubes with one another, is disclosed. The foregoing abstract is neither intended to define the invention disclosed in the specification, nor is it intended to limit the scope of the invention in any way.

5 Claims, 2 Drawing Figures

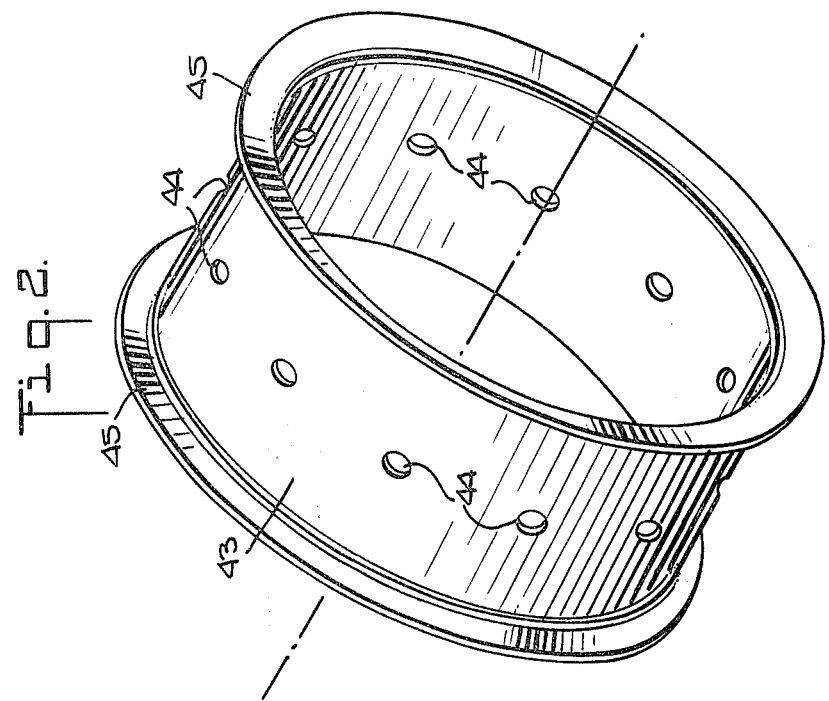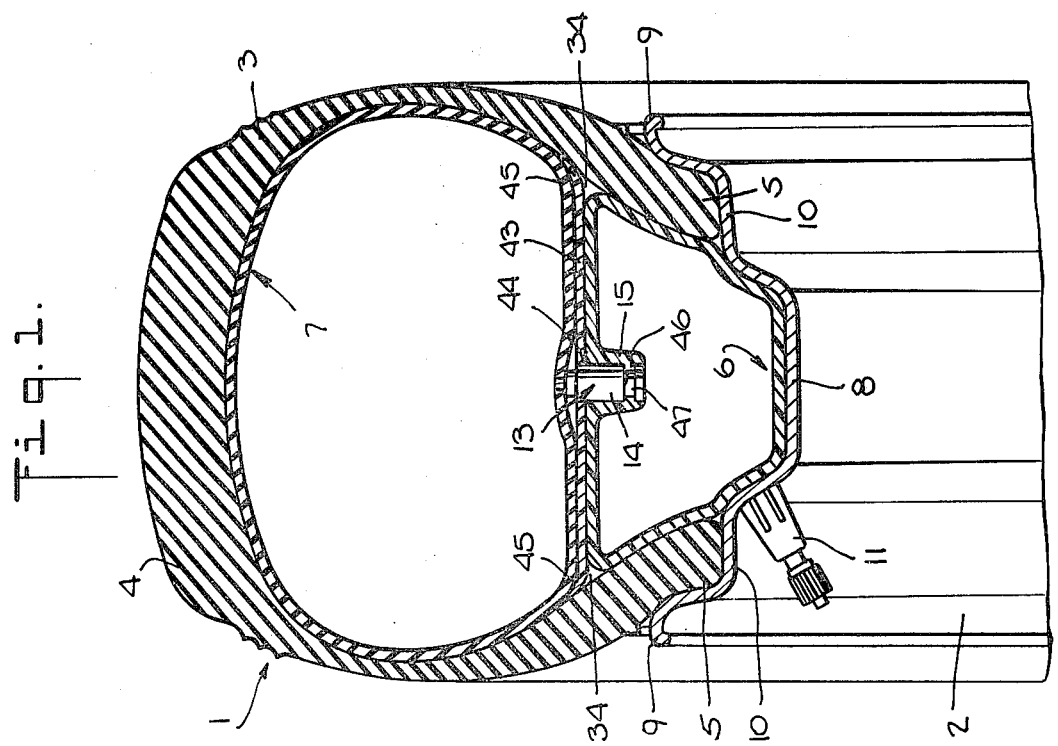

INNER TUBE ASSEMBLY FOR RUN-FLAT TIRES

BACKGROUND OF THE INVENTION

The present invention relates in general to the provision of an inner tube safety system for a partially puncture-proof, vehicular, pneumatic tire of the "runflat" variety. More particularly, the present invention relates to a pneumatic tire comprising means for partitioning the interior thereof into two inflatable annular chambers, one of which surrounds the other so if punctured will deflate to the exclusion of deflation of the inner chamber it surrounds.

It is already known to provide an inner tube safety system for pneumatic tires that comprises:

(a) a so-called primary, radially internal, continuous, endless annular inner tube made of a substantially inextensible flexible material in order to maintain a substantially constant crosssectional perimeter, the tube being adapted to surround contiguously and fit into the well of a vehicular wheel rim, the tube having an outside diameter that, in its mounted inflated state, is substantially less than the inside diameter of the crown region of an inflated tire the tube is to be associated with, the tube having a conventional inflation valve designed to pass through said rim; and (b) at least one system of a so-called secondary radially external inner tube means made of elastically expansible or dilatable material, circumferentially surrounding completely, contiguously, and substantially concentrically the primary inner tube, and filling out, in the mounted state, the balance or the remaining volume of the available inner space of the tire, the secondary inner tube means being connected, preferably detachably and hermetically with the primary inner tube by at least one "special valve" capable of (1) opening automatically to communicate the interiors of the primary and secondary tube systems with one another when they are under a mutual pressure equilibrium and (2) closing automatically when the secondary or outer tube means is punctured and loses its pressure equilibrium with the primary or inner tube. Such a "special valve" (or valves) is disclosed in copending U.S. patent application Ser. No. 703,339, filed July 8, 1976 now U.S. Pat. No. 4,054,169, dated Oct. 18, 1977, and assigned to Uniroyal, a Societe Anonyme, which assignee is the same assignee of the instant application, the contents of which is fully incorporated by reference herein.

The above known system is attended by the drawback of requiring a structure of relatively complex and costly primary inner tube constituent material due to its necessary inextensibility property.

SUMMARY OF THE INVENTION

The main object of the present invention is, therefore, to eliminate such drawbacks by creating a system that uses, with respect to the primary inner tube, a nonreinforced ordinary inner tube material that is preferably elastically extensible, such as, for instance, a pneumatic tire inner tube for a motorcycle wheel or the like. This is achieved by simultaneously providing means designed to limit the circumferential expansion of such a primary inner tube.

For this purpose, the inner tube system in accordance with the present invention comprises an ordinary radially internal primary inner tube made of a flexible material that is extensible or dilatable upon inflation, and an endless, continuous annular retainer element, preferably removable, made of a relatively flexible, but substantially inextensible, material having an inside diameter that is substantially equal to the maximum specified outside diameter that the primary inner tube is to define in its standard inflated mounted and operating configuration. The retainer element is in the form of a hoop or collar that retains the inner primary tube in a specified maximum diametral condition annularly spaced from the inner crown region of the tire it is to be disposed into. The latter said annular space is to be filled by a secondary tube system or means that is separated from the primary tube via the retainer element.

The retainer element forms in this way a partitioning wall providing a respective radially external bearing surface for the primary inner tube and a radially internal bearing surface for the secondary tube means, the axial extent or width of the said retainer element being at least equal to the span of the internal space of the pneumatic tire in its inflated operating configuration at the site that the retainer element is to be employed. It will be understood that the aforementioned "special" valves that interconnect the primary tube to the secondary tube means project through appropriate openings provided in the retainer element.

According to another characteristic of the present invention, the aforesaid annular retainer element is made of a synthetic plastic material such as, preferably polyurethane whose hardness is preferably selectively variable within wide limits, for instance between a Shore A hardness of 30 and 90 units.

According to yet another characteristic of the present invention, the aforesaid annular retainer element is made of artificial or synthetic rubber or of a thermoplastic synthetic elastomer known in the trade under the trademark designation "UNIROYAL TPR" which is endowed in particular with the properties of a vulcanized rubber and, in particular, with high heat resistance.

According to yet another characteristic of the present invention, the aforesaid retainer element is manufactured from an injection molded material, in particular under pressure.

The present invention, therefore, offers the advantage of a substantial reduction in the cost of the aforesaid inner tube system as a result of a substantial reduction in the manufacturing cost of the primary inner tube, and by the concomitant creation of an annular retainer element constituting a spacer element interpositioned between the primary inner tube and the secondary inner tube means, the retainer element being likewise made of a substance that is relatively inexpensive and simple to manufacture. Such design benefits are obtained without impairing either the efficiency, dependability, or operative safety of the system.

BRIEF DESCRIPTION OF THE DRAWINGS

The present invention will be better understood from the following detailed description thereof taken in conjunction with the drawings, in which:

FIG. 1 is an enlarged, fragmentary, vertical, cross-sectional view of the tube system of the present invention; and FIG. 2 is a perspective view of the retainer element of the present invention.

DETAILED DESCRIPTION OF THE INVENTION

Referring now to the drawings, there is illustrated in FIG. 1 a pneumatic tire 1 that is mounted on a wheel rim 2. The pneumatic tire 1 is comprised of a crown region 3 surrounded by a tread 4. The sidewalls are reinforced by a pair of annular beads 5, by means of which the tire 1 is mounted on the wheel rim 2. Wheel rim 2 includes a well or drop center 8, a pair of bead seats 10 and a pair of flanges 9. Confined in the tire 1 is a radially internal primary inner tube 6 and a radially external secondary inner tube 7.

The primary inner tube 6 is made from an extensible or dilatable flexible material, in particular a material that is elastically dilatable or extensible when inflated. The tube 6 is surrounded substantially coaxially by an annular retainer element 43 extending from one internal tire sidewall to the opposite internal sidewall. Because the primary tube means 6 lies partially radially coextensively with and axially between the beads 5 of the tire, inflation pressure within the primary tube causes it to bear against the beads 5 and brace them against the radially-extending portions of the flanges 9 of rim 2. A conventional filler valve 11 is provided to allow inflation of primary tube means 6. The retainer element 43 is interpositioned between the radially internal periphery of the secondary inner tube 7 and the radially external periphery of the primary inner tube 6.

The retainer element 43 (FIG. 2) is provided with circumferentially spaced apart orifices 44, the centers of which are situated in the median equatorial plane of the retainer element 43. The number of such orifices 44 corresponds to the number of special valves 13 connecting and intercommunicating the secondary inner tube 7 with primary inner tube 6. The special valves 13 are of the type disclosed in the aforementioned No. 4,054,169 which remain open as long as there is a pressure equilibrium in the tubes 6 and 7, and which close when such equilibrium is lost, for example, when the tube 7 is punctured. Clearly the valves 13 project through the apertures 44 to intercommunicate the tubes 6 and 7. In this regard, it will be understood that, as discussed in the aforesaid U.S. Pat. No. 4,054,169, the tube 7 may be comprised of a plurality of discrete, separately inflatable chambers each of which is associated with a respective one of the valves 13.

The retainer element 43 is substantially cylindrical or hoop-shaped, and is axially coextensive with the tubes 6 and 7 at the parting line therebetween. The opposite ends of the retainer element 43 are each provided with an annular or raised flange 45 that is at least substantially truncated or cone-shaped and divergent. The two flanges 45 are preferably substantially symmetrical with respect to the median equatorial plane of the retainer element 43. The retainer element 43 is made preferably of an inextensible material that is, however, flexible. The provision of the flanges 45 is advantageous in the sense that they embrace and anchor the axially endmost portions of the tube 7.

As illustrated in FIG. 1, there remains open two spaces 34 on each side between the pneumatic tire 1, the annular retainer element 43, and the primary inner tube 6. It is contemplated that such spaces 34 be filled with respective annular elements (not shown). Such elements may be made of rubber or the like appended to, for example, the wall structure of the tube 6. The appended annular elements would, preferably, be contoured to correspond to the contour of the spaces 34, and may be vulcanized or otherwise affixed to the tube 6.

Each special valve 13 has a body portion 14 constrained in a respective rubber tube stub 15 that is formed as part of the inner tube 6, the opposite end portion of each valve 13 being affixed to the outer or secondary inner tube 7. Pursuant to a preferred form of such an arrangement, each tube stub 15 is associated with its corresponding valve 13 in snap-fit, detachable relation. For example, each tube stub may be provided with an internal annular, collar-like, flange 46, and each corresponding valve 13 may have an associated annular groove 47.

Having thus set forth the nature of the present invention, it will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. An inner tube assembly for a pneumatic tire, said assembly comprising an annular, flexible, extensible primary tube means adapted to lie at least partially radially coextensively with and axially between the beads of the tire when the assembly is mounted in the tire, primary valve means connected to and communicating with the interior of said primary tube means, secondary tube means surrounding said primary tube means, secondary valve means interconnecting and communicating with the interiors of said primary and secondary tube means, and an apertured, substantially inextensible, flexible annular band interposed between said primary and secondary tube means, said band being coextensive axially with said primary tube means and said secondary tube means at a parting line therebetween, said band having an axial extent at least equal to the span of the internal space of the tire in its inflated operating condition at the location occupied by said band in said operating condition, whereby said band will limit the circumferential expansion of said primary tube means to a specified amount upon the inflation of the latter via said primary valve means, said secondary valve means remaining open and intercommunicating through said apertured band the interiors of said primary and secondary tube means for as long as there remains an equilibrium of pressure therebetween, said secondary valve means including closure means for pneumatically isolating the interiors of said primary and secondary tube means from one another when the equilibrium of pressure between said primary and secondary tube means is lost.

2. An inner tube assembly as claimed in claim 1, wherein said band includes at each of the axially opposite ends thereof a respective radially outwardly projecting frusto-conical flange.

3. An inner tube assembly as claimed in claim 1, wherein said band is provided with a central, circumferential array of apertures corresponding in number to the number of said secondary valve means.

4. An inner tube assembly as claimed in claim 1, wherein said secondary tube means comprises a plurality of discrete, separately inflatable chambers, and wherein said secondary valve means comprises a plurality of separate valves, each of said valves being connected to a respective one of said inflatable chambers.

5. An inner tube assembly as claimed in claim 1 wherein said secondary valve means includes a body extending through an aperture in said band, said body is attached at one end thereof to said secondary tube means and said body is attached at the other end thereof to said primary tube means, so that said secondary tube means, said band and said primary tube means form an integral subassembly for installation in said tire.

* * * * *